(12) United States Patent
Higashi

(10) Patent No.: US 12,415,734 B2
(45) Date of Patent: Sep. 16, 2025

(54) METHOD OF PRODUCING A TITANIUM-NIOBIUM COMPOSITE OXIDE

(71) Applicant: KUBOTA CORPORATION, Osaka (JP)

(72) Inventor: Kenji Higashi, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 604 days.

(21) Appl. No.: 17/917,308

(22) PCT Filed: May 12, 2021

(86) PCT No.: PCT/JP2021/018036
§ 371 (c)(1),
(2) Date: Oct. 6, 2022

(87) PCT Pub. No.: WO2021/235289
PCT Pub. Date: Nov. 25, 2021

(65) Prior Publication Data
US 2023/0150832 A1   May 18, 2023

(30) Foreign Application Priority Data

May 19, 2020   (JP) ................................ 2020-087647

(51) Int. Cl.
*C01G 33/00*   (2006.01)
*C01G 23/04*   (2006.01)

(52) U.S. Cl.
CPC ............. *C01G 33/00* (2013.01); *C01G 23/04* (2013.01); *C01P 2002/60* (2013.01); *C01P 2002/70* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 2019/0296343 A1 | 9/2019 | Harada et al. | |
| 2021/0340022 A1* | 11/2021 | Milliron | G02F 1/1524 |
| 2023/0071080 A1* | 3/2023 | Shivareddy | H01M 4/583 |

FOREIGN PATENT DOCUMENTS

| | | |
|---|---|---|
| JP | 2010-287496 A | 12/2010 |
| JP | 2019-169343 A | 10/2019 |
| JP | 2021-082420 A | 5/2021 |
| WO | WO-2021074406 A1 * | 4/2021 ............ H01M 4/133 |

OTHER PUBLICATIONS

Zhang et al. Nanoscale Phase Engineering in Two-Dimensional Niobium Pentoxide Anodes toward Excellent Electrochemical Lithium Storage. ACS Appl Energy Mater, 5, 4551-4560 (Year: 2021).*
Official Communication issued in International Patent Application No. PCT/JP2021/018036, mailed on Jul. 27, 2021.
Yoshimura et al., "Hydrothermal Oxidation of Niobium Metal", Journal of the Ceramic Society of Japan, vol. 96, 1988, pp. 29-35.
Izumi et al., "Crystallization and Relative Stabilities of Polymorphs of Niobium(V) Oxide Under Hydrothermal Conditions", Z. anorg. allg. Chem. 440, 1978, pp. 155-167.
Cava et al., "Lithium Insertion in Wadsley-Roth Phases Based on Niobium Oxide", Journal of The Electrochemical Society, 1983, 8 pages.

* cited by examiner

*Primary Examiner* — Tanisha Diggs
(74) *Attorney, Agent, or Firm* — Keating & Bennett, LLP

(57) ABSTRACT

A production method of a titanium-niobium composite oxide uses, as a source material, niobium oxide including a mixture of a plurality of crystal forms including a first $Nb_2O_5$ structure and at least either of a second $Nb_2O_5$ structure and a third $Nb_2O_5$ structure. The first $Nb_2O_5$ structure has a first peak with $2\theta$ from 23.6° to 23.8°, a peak with $2\theta$ from 24.8° to 25.0°, and a peak with $2\theta$ from 25.4° to 25.6°. The second $Nb_2O_5$ structure has a peak with $2\theta$ from 23.7° to 23.9°, a peak with $2\theta$ from 24.3° to 24.5°, and a peak with $2\theta$ from 25.4° to 25.6°. The third $Nb_2O_5$ structure has a peak with $2\theta$ from 22.5° to 22.7°, a peak with $2\theta$ from 28.3° to 28.5°, and a peak with $2\theta$ from 28.8° to 29.0°.

5 Claims, 4 Drawing Sheets

Fig. 1

| | CRYSTAL FORM CONTAINED | | | NIOBIUM OXIDE COMPOSITION (X-RAY DIFFRACTION ANALYSIS RESULTS) | | | | | | TITANIUM-NIOBIUM COMPOSITE OXIDE COMPOSITION (X-RAY DIFFRACTION ANALYSIS RESULTS) | | | | | |
|---|---|---|---|---|---|---|---|---|---|---|---|---|---|---|---|
| | | | | P2 24.8°~25.0° | | P5 24.3°~24.5° | | P7 22.5°~22.7° | | | $TiNb_2O_7$ 26.2°~26.4° | | $Ti_2Nb_{10}O_{29}$ 24.8°~25.1° | | $TiO_2$ (Rutile) 27.2°~27.6° | |
| | M | T | H | INTENSITY cps | | INTENSITY cps | P5/P2 | INTENSITY cps | P7/P2 | | INTENSITY cps | | INTENSITY cps | INTENSITY RATIO % | INTENSITY cps | INTENSITY RATIO % |
| PRACTICAL EXAMPLE 1 | ○ | ○ | ○ | 2317 | | 1520 | 0.66 | 1627 | 0.70 | | 4063 | | 187 | 4.6 | 150 | 3.7 |
| PRACTICAL EXAMPLE 2 | ○ | — | ○ | 2370 | | 1403 | 0.59 | — | — | | 4282 | | 223 | 5.2 | 141 | 3.3 |
| PRACTICAL EXAMPLE 3 | ○ | — | ○ | 1920 | | 2007 | 1.05 | — | — | | 3876 | | 260 | 6.7 | 132 | 3.4 |
| PRACTICAL EXAMPLE 4 | ○ | — | ○ | 1190 | | 4210 | 3.54 | — | — | | 4347 | | 370 | 8.5 | 153 | 3.5 |
| PRACTICAL EXAMPLE 5 | ○ | ○ | ○ | 1440 | | 4237 | 2.94 | 200 | 0.14 | | 4367 | | 287 | 6.6 | 140 | 3.2 |
| COMPARATIVE EXAMPLE 1 | — | — | ○ | — | | 3450 | — | — | — | | 3867 | | 780 | 20.2 | 367 | 9.5 |

Fig. 2

| | CRYSTAL FORM CONTAINED | | | NIOBIUM OXIDE COMPOSITION (X-RAY DIFFRACTION ANALYSIS RESULTS) | | | | | | TITANIUM-NIOBIUM COMPOSITE OXIDE COMPOSITION (X-RAY DIFFRACTION ANALYSIS RESULTS) | | | | | D50=3 μm CRUSHING TIME |
|---|---|---|---|---|---|---|---|---|---|---|---|---|---|---|---|
| | | | | P2 24.8°~25.0° | P7 22.5°~22.7° | | P5 24.3°~24.5° | | TiNb$_2$O$_7$ 26.2°~26.4° | Ti$_2$Nb$_{10}$O$_{29}$ 24.8°~25.1° | | TiO$_2$(Rutile) 27.2°~27.6° | | |
| | M | T | H | INTENSITY cps | INTENSITY cps | P7/P2 | INTENSITY cps | P5/P2 | INTENSITY cps | INTENSITY cps | INTENSITY RATIO % | INTENSITY cps | INTENSITY RATIO % | min |
| PRACTICAL EXAMPLE 1 | ○ | ○ | ○ | 2317 | 1627 | 0.70 | 1520 | 0.66 | 4063 | 187 | 4.6 | 150 | 3.7 | 190 |
| PRACTICAL EXAMPLE 5 | ○ | ○ | ○ | 1440 | 200 | 0.14 | 4237 | 2.94 | 4367 | 287 | 6.6 | 140 | 3.2 | 180 |
| PRACTICAL EXAMPLE 6 | ○ | ○ | — | 1060 | 5480 | 5.17 | — | — | 3740 | 123 | 3.3 | 110 | 2.9 | 210 |
| PRACTICAL EXAMPLE 7 | ○ | ○ | — | 573 | 5890 | 10.27 | — | — | 3583 | 130 | 3.6 | 90 | 2.5 | 225 |
| PRACTICAL EXAMPLE 8 | ○ | ○ | — | 333 | 6377 | 19.13 | — | — | 3657 | 87 | 2.4 | 90 | 2.5 | 240 |
| COMPARATIVE EXAMPLE 2 | — | ○ | — | — | 6060 | — | — | — | 3667 | 97 | 2.6 | 87 | 2.3 | 330 |

METHOD OF PRODUCING A TITANIUM-NIOBIUM COMPOSITE OXIDE

BACKGROUND OF THE INVENTION

1. Field of the Invention

The present invention relates to a method of producing a titanium-niobium composite oxide.

2. Description of the Related Art

Titanium-niobium composite oxides are expected for use as an active material in lithium-ion secondary cells for their high electrical capacitance and excellent cycle capacitance retention (see, for example, JP-A-2010-287496). In connection with such titanium-niobium composite oxides, for example, JP-A-2010-287496 and R. J. Cava, D. W. Murphy, S. M. Zahurak, Journal of The Electrochemical Society, 130 (1983) 2345-2351, discuss technologies of synthesizing $TiNb_2O_7$ by solid-phase reaction.

SUMMARY OF THE INVENTION

In synthesis of a titanium-niobium composite oxide by solid-phase reaction, the titanium-niobium composite oxide is affected greatly by the various physical properties of the source materials used. If this results in an incomplete reaction, $TiNb_2O_7$ as the desired product is adulterated with large proportions of $TiO_2$ and $Ti_2Nb_{10}O_{29}$. On the other hand, if excessive progress of the reaction results in firm neck sintering among $TiNb_2O_7$ particles, crushing them to the desired grain size requires excessive amounts of time and energy and, in the process of crushing, destruction of crystals progresses so far as to degrade the charge-discharge performance of the titanium-niobium composite oxide.

For example, in a case where $TiNb_2O_7$ is produced using $Nb_2O_5$ and $TiO_2$ as source materials, their blending ratio $Nb_2O_5/TiO_2$ is about 3.5 in terms of ratio by mass (about 3 in terms of ratio by volume). Thus, the titanium-niobium composite oxide is affected to a comparatively large extent by $Nb_2O_5$. Moreover, since $Nb_2O_5$ has a large number of crystal forms, the titanium-niobium composite oxide is greatly affected by differences among those crystal forms of $Nb_2O_5$.

Preferred embodiments of the present invention provide methods of producing a titanium-niobium composite oxide that suppresses adulteration with $TiO_2$ and $Ti_2Nb_{10}O_{29}$, and also neck sintering among particles of $TiNb_2O_7$, through the use as a source material of $Nb_2O_5$ with a suitably controlled crystal form.

According to an example embodiment of the present invention, in a method of producing a titanium-niobium composite oxide, use is made of, as a source material, niobium oxide including a combination of a plurality of crystal forms including a first $Nb_2O_5$ structure and at least either of a second $Nb_2O_5$ structure and a third $Nb_2O_5$ structure. The first $Nb_2O_5$ structure includes, in its X-ray diffraction spectrum as observed using a Cu-Kα line source, a first peak with a diffraction angle 2θ in the range of 23.6° to 23.8°, a second peak with a diffraction angle 2θ in the range of 24.8° to 25.0°, and a third peak with a diffraction angle 2θ in the range of 25.4° to 25.6°. The second $Nb_2O_5$ structure includes, in its X-ray diffraction spectrum as observed using a Cu-Kα line source, a fourth peak with a diffraction angle 2θ in the range of 23.7° to 23.9°, a fifth peak with a diffraction angle 2θ in the range of 24.3° to 24.5°, and a sixth peak with a diffraction angle 2θ in the range of 25.4° to 25.6°. The third Nb2O5 structure includes, in its X-ray diffraction spectrum as observed using a Cu-Kα line source, a seventh peak with a diffraction angle 2θ in the range of 22.5° to 22.7°, an eighth peak with a diffraction angle 2θ in the range of 28.3° to 28.5°, and a sixth peak with a diffraction angle 2θ in the range of 28.8° to 29.0°.

In a production method according to an example embodiment of the present invention, preferably, the niobium oxide includes the combination of the plurality of crystal forms such that at least either the intensity ratio of the fifth peak to the second peak is 4 or less or the intensity ratio of the seventh peak to the second peak is 20 or less.

In a production method according to an example embodiment of the present invention, preferably, the niobium oxide includes the combination of the plurality of crystal forms such that at least either the intensity ratio of the fifth peak to the second peak is 2 or less or the intensity ratio of the seventh peak to the second peak is 11 or less.

In a production method according to an example embodiment of the present invention, preferably, the niobium oxide includes the combination of the plurality of crystal forms such that at least either the intensity ratio of the fifth peak to the second peak is 1 or less or the intensity ratio of the seventh peak to the second peak is 6 or less.

A production method according to an example embodiment of the present invention preferably includes mixing the niobium oxide including the combination of the plurality of crystal forms with titanium oxide or a titanium compound that produces titanium oxide when heated such that the atomic ratio of niobium to titanium is 1 to 3, and sintering the mixture produced in the mixing step at a temperature of 1000° C. to 1300° C.

With a production method according to an example embodiment of the present invention, it is possible to produce a titanium-niobium composite oxide with reduced adulteration with $TiO_2$ or $Ti_2Nb_{10}O_{29}$ and reduced neck-sintering among $TiNb_2O_7$ particles. Thus, by using a titanium-niobium composite oxide produced by a production method according to an example embodiment of the present invention as, for example, an electrode active material in an lithium-ion secondary cell, it is possible to enhance the charge-discharge characteristics of the lithium-ion cell.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 shows the results of analysis of titanium-niobium composite oxides produced by production methods of Practical Examples 1 to 5 and Comparative Example 1.

FIG. 2 shows the results of analysis of titanium-niobium composite oxides produced by production methods of Practical Examples 1 and 5 to 8 and Comparative Example 2.

DETAILED DESCRIPTION OF THE PREFERRED EMBODIMENTS

Figure 3:
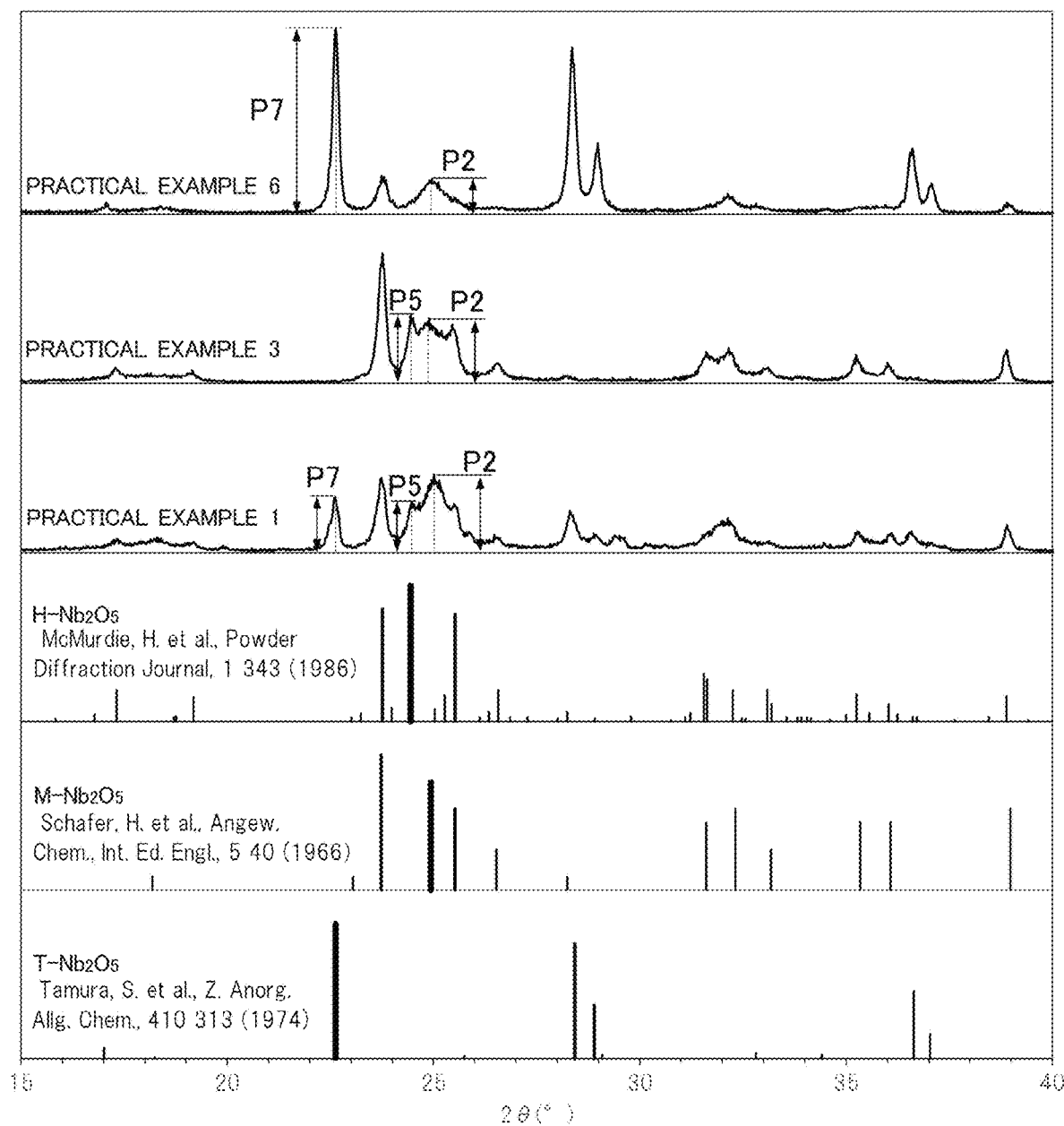
FIG. 3 shows the X-ray diffraction spectra of niobium oxides used in Practical Examples 1, 3, and 6.

Hereinafter, as preferred embodiments of the present invention, titanium-niobium composite oxides produced by production methods according to the present invention will be described.

For the production of a titanium-niobium composite oxide, as a niobium source, niobium oxide is prepared that includes a combination of a plurality of crystal forms including a first $Nb_2O$ structure along with at least either of a second $Nb_2O_5$ structure and a third $Nb_2O_5$ structure.

In its X-ray diffraction spectrum observed using a Cu-Kα line source (wavelength: 0.15418 nm), the first $Nb_2O_5$ structure has a first peak with a diffraction angle 2θ in the range of 23.6° to 23.8°, a second peak with a diffraction angle 2θ in the range of 24.8° to 25.0°, and a third peak with a diffraction angle 2θ in the range of 25.4° to 25.6°. In the following description, the first $Nb_2O_5$ structure will be referred to as the M-$Nb_2O_5$ structure.

In its X-ray diffraction spectrum observed using a Cu-Kα line source, the second $Nb_2O_5$ structure has a fourth peak with a diffraction angle 2θ in the range of 23.7° to 23.9°, a fifth peak with a diffraction angle 2θ in the range of 24.3° to 24.5°, and a sixth peak with a diffraction angle 2θ in the range of 25.4° to 25.6°. In the following description, the second $Nb_2O_5$ structure will be referred to as the H—$Nb_2O_5$ structure.

In its X-ray diffraction spectrum observed using a Cu-Kα line source, the third $Nb_2O_5$ structure has a seventh peak with a diffraction angle 2θ in the range of 22.5° to 22.7°, an eighth peak with a diffraction angle 2θ in the range of 28.3° to 28.5°, and a ninth peak with a diffraction angle 2θ in the range of 28.8° to 29.0°. In the following description, the third $Nb_2O_5$ structure will be referred to as the T-$Nb_2O_5$ structure.

The H—$Nb_2O_5$ structure is a high-temperature phase. The H—$Nb_2O_5$ structure has primary crystal particles that have grown into rod-shaped grains, and exhibits superb flowability and handleability. However, use of niobium oxide containing a large proportion of the H—$Nb_2O_5$ structure as a niobium source inhibits microscopic dispersibility and diminishes reactivity, leading to $TiNb_2O_7$ as the desired product being adulterated with large proportions of $TiO_2$ and $Ti_2Nb_{10}O_{29}$.

The T-$Nb_2O_5$ structure is a low-temperature phase. The T-$Nb_2O_5$ structure has a very fine primary crystal particles and, though somewhat poor in flowability and handleability, exhibits superb dispersibility and reactivity in solid-phase reactions. However, use of niobium oxide containing almost solely the H—$Nb_2O_5$ structure as a niobium source increases the neck-sintered portion of the titanium-niobium composite oxide and requires excessive crushing in a crushing step for grain size adjustment, which will be described later, leading to diminished crystallinity of the titanium-niobium composite oxide.

The M-$Nb_2O_5$ structure is a middle-temperature phase between the T-$Nb_2O_5$ structure and the H—$Nb_2O_5$ structure. The M-$Nb_2O_5$ structure has primary crystal particles that are larger than those of the T-$Nb_2O_5$ structure but that have not grown into rod-shaped grains like those of the H—$Nb_2O_5$ structure. The M-$Nb_2O_5$ structure, though slightly poor in reactivity compared with the T-$Nb_2O_5$ structure, is suitable to suppress the lowering of crystallinity resulting from neck sintering.

Based on the above discussion, with consideration given to reactivity, suppression of neck sintering, and handleability, in the present preferred embodiment, for example, it is preferable to use, as a niobium source, niobium oxide that has the M-$Nb_2O_5$ structure along with at least either of the H—$Nb_2O_5$ structure and the T-$Nb_2O_5$ structure.

The phase mix ratio of the different crystal forms is defined as follows. For niobium oxide containing at least the H—$Nb_2O_5$ structure, the intensity ratio of the fifth peak to the second peak is preferably 4 or less. If the intensity ratio of the fifth peak to the second peak is more than four, that results in slightly poor reactivity and adulteration with increased proportions of $TiO_2$ and $Ti_2Nb_{10}O_{29}$. The intensity ratio is more preferably two or less, and further preferably one or less.

For $Nb_2O_5$ containing at least the T-$Nb_2O_5$ structure, the intensity ratio of the seventh peak to the second peak is preferably 20 or less. If the intensity ratio of the seventh peak to the second peak is more than 20, that results in increased neck sintering after sintering. The intensity ratio is more preferably 11 or less, and further preferably six or less.

For the production of a titanium-niobium composite oxide, as a titanium source, titanium oxide or a titanium compound that produces titanium oxide when heated is prepared. The blending ratio between the niobium source and the titanium source is, in terms of atomic ratio of niobium to titanium, preferably 1 to 3, more preferably 1.5 to 2.5, and further preferably 1.9 to 2.1.

In a mixing step in which the niobium source and the titanium source are mixed together, a crushing-mixing machine such as a ball mill, vibration mill, or bead mill can be used. To prevent depositing of the mixture on the crushing-mixing machine used, alcohol (e.g., ethanol) may be added as an auxiliary agent to the source materials described above.

In a sintering step, the mixture obtained in the mixing step is sintered in the atmosphere by being held in an appropriate temperature range for an appropriate length of time. This produces a titanium-niobium composite oxide with sintered primary particles.

The appropriate temperature range and the appropriate length of time mentioned above cover values such that satisfactory crystals are obtained and in addition crystal grains do not grow excessively. The appropriate temperature range is preferably 1000° C. to 1300° C., and more preferably 1100° C. to 1200° C. The appropriate length of time is preferably 1 hour to 24 hours, and more preferably 2 hours to 6 hours. The mixture may be sintered in any environment (e.g., nitrogen environment) other than in the atmosphere.

In a crushing step for particle size adjustment, the sintered product obtained in the sintering step is, as necessary, coarsely crushed using a power mill or the like and is then adjusted to an adequate particle size using a fine crushing machine such as a ball mill or a jet mill.

The mesh used in coarse crushing is preferably about 0.5 mm to 2 mm. The adequate particle size after fine crushing is, in terms of median diameter ($D_{50}$) as measured on a laser diffraction particle size distribution analyzer, preferably 1 μm to 10 μm, and more preferably 2 μm to 5 μm.

Hereinafter, the present invention will be described in more detail by way of practical examples, which however are not meant to limit the scope of the present invention. That is, of the various processing methods and granulation methods described below, any parts to which generally known techniques can be applied may be modified accordingly without being restricted by the practical examples described below.

EXAMPLES

Practical Example 1

Preliminarily, 6.16 kg of powder of niobium oxide ($Nb_2O_5$) that included a combination of the M-$Nb_2O_5$ structure, the H—$Nb_2O_5$ structure, and the T-$Nb_2O_5$ structure such that the intensity ratio of the fifth peak to the second peak was 0.7 and that the intensity ratio of the seventh peak to the second peak was 0.7 was mixed with 1.84 kg of powder of titanium oxide ($TiO_2$) in an Eirich mixer. After that, while ethanol as an auxiliary agent was added to the mixture, the mixture was continuously fed into a bead mill, at a rate of 5 kg per hour, to be crushed and mixed.

The crushed mixture obtained was put in an alumina tray, and was sintered in an electric furnace (processing temperature: 1100° C., processing duration: 4 hours).

The sintered product obtained was then coarsely crushed in a power mill until it passed through a mesh of 1 mm, and then 5 kg of the coarsely crushed grain was along with water put in an alumina ball mill with an interior volume of 26 L to be wet-crushed. Wet-crushing was performed while the particle size of the crushed slurry was monitored, as time passed, using a laser diffraction particle size distribution analyzer, and was stopped when the particle size in terms of median diameter ($D_{50}$) was observed to be 3 μm or less.

The crushed slurry obtained was then spray-dried with a spray dryer, and thus powder of a titanium-niobium composite oxide was obtained. The powder of the titanium-niobium composite oxide obtained chiefly contained $TiNb_2O_7$. The powder of the titanium-niobium composite oxide obtained may contain $TiO_2$ or $Ti_2Nb_{10}O_{29}$.

Practical Example 2

Except for the use of powder of niobium oxide that included a combination of the $M-Nb_2O_5$ structure and the $H-Nb_2O_5$ structure such that the intensity ratio of the fifth peak to the second peak was 0.6, a titanium-niobium composite oxide was produced by the same method as Practical Example 1.

Practical Example 3

Except for the use of powder of niobium oxide that included a combination of the $M-Nb_2O_5$ structure and the $H-Nb_2O_5$ structure such that the intensity ratio of the fifth peak to the second peak was 1.1, a titanium-niobium composite oxide was produced by the same method as Practical Example 1.

Practical Example 4

Except for the use of powder of niobium oxide that included a combination of the $M-Nb_2O_5$ structure and the $H-Nb_2O_5$ structure such that the intensity ratio of the fifth peak to the second peak was 3.7, a titanium-niobium composite oxide was produced by the same method as Practical Example 1.

Practical Example 5

Except for the use of powder of niobium oxide that included a combination of the $M-Nb_2O_5$ structure, the $H-Nb_2O_5$ structure, and the $T-Nb_2O_5$ structure such that the intensity ratio of the fifth peak to the second peak was 2.9 and that the intensity ratio of the seventh peak to the second peak was 0.1, a titanium-niobium composite oxide was produced by the same method as Practical Example 1.

Practical Example 6

Except for the use of powder of niobium oxide that included a combination of the $M-Nb_2O_5$ structure and the $T-Nb_2O_5$ structure such that the intensity ratio of the seventh peak to the second peak was 5.2, a titanium-niobium composite oxide was produced by the same method as Practical Example 1.

Practical Example 7

Except for the use of powder of niobium oxide that included a combination of the $M-Nb_2O_5$ structure and the $T-Nb_2O_5$ structure such that the intensity ratio of the seventh peak to the second peak was 10.3, a titanium-niobium composite oxide was produced by the same method as Practical Example 1.

Practical Example 8

Except for the use of powder of niobium oxide that included a combination of the $M-Nb_2O_5$ structure and the $T-Nb_2O_5$ structure such that the intensity ratio of the seventh peak to the second peak was 19.1, a titanium-niobium composite oxide was produced by the same method as Practical Example 1.

Comparative Example 1

Except for the use of powder of niobium oxide that solely had the $H-Nb_2O_5$ structure, a titanium-niobium composite oxide was produced by the same method as Practical Example 1.

Comparative Example 2

Except for the use of powder of niobium oxide that solely had the $T-Nb_2O_5$ structure, a titanium-niobium composite oxide was produced by the same method as Practical Example 1.

<Analyzer>

For the analysis of the titanium-niobium composite oxides produced by the methods of Practical Examples 1 to 8 and Comparative Examples 1 and 2, the following analyzers were used:

X-ray diffractometer, model Ultima IV, manufactured by Rigaku Corporation.

Laser diffraction particle size distribution analyzer, model MT3000 II, manufactured by MicrotracBEL Corporation.

<Analysis Results>

FIG. 1 shows the analysis results of Practical Examples 1 to 5 and Comparative Example 1, which used niobium oxide that contained at least the $H-Nb_2O_5$ structure as a niobium source. FIG. 2 shows the analysis results of Practical Examples 1 and 5 to 8 and Comparative Example 2, which used niobium oxide that contained at least the $T-Nb_2O_5$ structure as a niobium source.

FIGS. 1 and 2 show the following as learned from the X-ray diffraction spectra of the niobium oxides used as the niobium source: the composition of crystal forms; and the relative intensity of any peak of niobium oxide with a diffraction angle 2θ in each of the ranges of 24.8° to 25.0°, 24.3° to 24.5°, and 22.5° to 22.7°. The second peak, which appears with a diffraction angle 2θ in the range of 24.8° to 25.0°, is a peak ascribable to the $M-Nb_2O$ structure. The fifth peak, which appears with a diffraction angle 2θ in the range of 24.3° to 24.5°, is a peak ascribable to the $H-Nb_2O_5$ structure. The seventh peak, which appears with a diffraction angle 2θ in the range of 22.5° to 22.7°, is a peak ascribable to the $T-Nb_2O_5$ structure. FIG. 3 shows, as an example of the X-ray diffraction spectra of the niobium oxides used in the practical examples, the X-ray diffraction spectra of the niobium oxides used in Practical Examples 1, 3, and 6. In the X-ray diffraction spectrum of the niobium oxide used in Practical Example 1 appear the second, fifth, and seventh peaks P2, P5, and P7. In the X-ray diffraction spectrum of the niobium oxide used in Practical Example 3 appear the second and fifth peaks P2 and P5. In the X-ray diffraction spectrum of the niobium oxide used in Practical Example 6 appear the second and seventh peaks P2 and P7.

FIGS. 1 and 2 also show the intensity ratio (P5/P2) of the fifth peak P5 to the second peak P2 and the intensity ratio (P7/P2) of the seventh peak P7 to the second peak P2.

FIGS. 1 and 2 further show the intensity of any peak (in relative value) with a diffraction angle 2θ in each of the ranges of 26.2° to 26.4°, 24.8° to 25.1°, and 27.2° to 27.6 in the X-ray diffraction spectrum of each of the titanium-niobium composite oxides synthesized using different niobium oxide. A peak with a diffraction angle 2θ in the range of 26.2° to 26.4° is one ascribable to the crystal of $TiNb_2O_7$ as the desired product. A peak with a diffraction angle 2θ in the range of 24.8° to 25.1° is one ascribable to the crystal of $Ti_2Nb_{10}O_{29}$. A peak with a diffraction angle 2θ in the range of 27.2° to 27.6 is one ascribable to the crystal of $TiO_2$.

FIG. 2 also shows the crushing time required to obtain a median diameter ($D_{50}$) of 3 μm as estimated from the measurements of the laser diffraction particle size distribution acquired as time passed during wet-crushing.

FIG. 1 reveals the following. Compared with Comparative Example 1, Practical Examples 1 to 5 were adulterated with lower proportions of $TiO_2$ and $Ti_2Nb_{10}O_{29}$. Moreover, in a comparison among Practical Examples 2, 4, and 5, where the niobium source used was niobium oxide that included a combination of the M-$Nb_2O_5$ structure and the H—$Nb_2O_5$ structure, a lower intensity ratio (P5/P2) of the second peak P5 to the second peak P2 resulted in adulteration with a lower proportion of $Ti_2Nb_{10}O_{29}$. Furthermore, Practical Examples 1 and 5, where the niobium source used was niobium oxide that had the T-$Nb_2O_5$ structure as well, tended to be adulterated with a lower proportion of $Ti_2Nb_{10}O_{29}$ than Practical Examples 2, 4, and 5, where the niobium source used was niobium oxide that did not contain the T-$Nb_2O_5$ structure.

FIG. 2 reveals the following. Using niobium oxide containing the T-$Nb_2O_5$ structure as the niobium source invariably resulted in good reactivity combined with adulteration with lower proportions of the $TiO_2$ and $Ti_2Nb_{10}O_{29}$. However, compared with Comparative Example 2, the Practical Examples 1 and 5 to 8 required less crushing time until a median diameter ($D_{50}$) of 3 μm was obtained. This probably resulted from suppressed neck-sintering. Moreover, a lower intensity ratio (P5/P2) of the fifth peak P5 to the second peak P2 tended to result in a shorter crushing time.

<Application to Lithium-Ion Secondary Cells>

For example, electrodes can be fabricated using, as an active material, any of the titanium-niobium composite oxides of Practical Examples 1 to 8. In one specific example, first, 10 parts by weight of polyvinylidene fluoride is dissolved in n-methyl-2-pyrrolidone. Next, 10 parts by weight of conductive carbon as a conductive auxiliary agent and 100 parts by weight of one of the titanium-niobium composite oxides of Practical Examples 1 to 8 are added. The mixture is then mixed and kneaded in a planetary centrifugal mixer to prepare paint. This paint is applied over aluminum foil, and then the product is vacuum-dried at 120° C., is pressed, and is punched into a circular shape.

Figure 4:
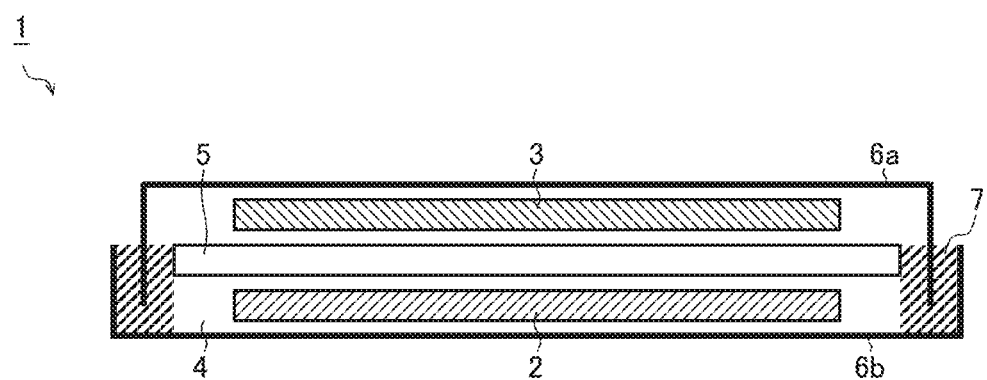
FIG. 4 is a schematic diagram showing a 2032 coin cell.

Using the electrode fabricated as described above, for example, a 2032 coin cell 1 as shown in FIG. 4 can be assembled. The 2032 coin cell 1 shown in FIG. 4 is one example of a lithium-ion secondary cell. The 2032 coin cell 1 is fabricated by holding between a top case 6a and a bottom case 6b an electrode 2, an opposite electrode 3, nonaqueous electrolyte 4, and a separator 5 and sealing around the top and bottom cases 6a and 6b with a gasket 7.

Usable as the opposite electrode 3 is, for example, metal lithium foil. Usable as the nonaqueous electrolyte 4 is, for example, 1 mol/L of $LiPF_6$ dissolved in a 1:1 v/v % mixture of ethylene carbonate and dimethyl carbonate. Usable as the separator 5 is, for example, a microporous membrane of polypropylene.

An electrode in which at least a portion of an electrode active material is a titanium-niobium composite oxide according to a preferred embodiment of the present invention can be used as a cathode of a lithium-ion secondary cell or as an anode of a lithium-ion secondary cell.

In a case where a titanium-niobium composite oxide produced by a production method according to a preferred embodiment of the present invention is used in an electrode active material in a lithium-ion secondary cell, a portion of the surface of the titanium-niobium composite oxide produced by the production method according to a preferred embodiment of the present invention may be coated with a carbon material.

Now, an example of a method of producing a titanium-niobium composite oxide of which a portion of the surface is coated with a carbon material will be described. For example, a water solution of polyvinyl alcohol is added to one of the titanium-niobium composite oxides of Practical Examples 1 to 8 such that the content of PVA is 13 wt % (weight percent). The mixture is then crushed and mixed in a ball mill, and is then dried with a spray dryer. Thereafter the dried product is heat-treated in a nitrogen environment (processing temperature: 800° C.; processing time: 4 hours). In this way, a titanium-niobium composite oxide of which a portion of the surface is coated with a carbon material is prepared.

<Modifications>

The preferred embodiments by way of which the present invention has been described above are in no way meant to limit the scope of the present invention, which thus allows for many modifications without departure from the spirit of the present invention. That is, the preferred embodiments described above should be considered to be in every aspect illustrative and not restrictive, and the technical scope of the present invention should be understood to be defined not by the description of the preferred embodiments given above but by the appended claims and to encompass any modifications made in a sense and scope equivalent to the claims.

Titanium-niobium composite oxides produced by production methods according to various preferred embodiments of the present invention find applications, for example, as electrode active materials used in electrodes for lithium-ion secondary cells.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A method of producing a titanium-niobium composite oxide, the method comprising mixing a niobium oxide with titanium oxide or a titanium compound that produces a titanium oxide when heated, wherein the niobium oxide includes a mixture of a plurality of crystal forms including:

a first $Nb_2O_5$ structure; and at least either of a second $Nb_2O_5$ structure and a third $Nb_2O_5$ structure; wherein the first $Nb_2O_5$ structure includes, in an X-ray diffraction spectrum thereof as observed using a Cu-Kα line source:
a first peak with a diffraction angle 2θ in a range of 23.6° to 23.8°;
a second peak with a diffraction angle 2θ in a range of 24.8° to 25.0°; and
a third peak with a diffraction angle 2θ in a range of 25.4° to 25.6°;
the second $Nb_2O_5$ structure includes, in an X-ray diffraction spectrum thereof as observed using a Cu-Kα line source:
a fourth peak with a diffraction angle 2θ in a range of 23.7° to 23.9°;
a fifth peak with a diffraction angle 2θ in a range of 24.3° to 24.5°; and
a sixth peak with a diffraction angle 2θ in a range of 25.4° to 25.6°; and
the third $Nb_2O_5$ structure includes, in an X-ray diffraction spectrum thereof as observed using a Cu-Kα line source:
a seventh peak with a diffraction angle 2θ in a range of 22.5° to 22.7°;
an eighth peak with a diffraction angle 2θ in a range of 28.3° to 28.5°; and
a sixth peak with a diffraction angle 2θ in a range of 28.8° to 29.0°.

2. The method according to claim 1, wherein
the niobium oxide includes the mixture of the plurality of crystal forms such that at least either:
an intensity ratio of the fifth peak to the second peak is 4 or less; or
an intensity ratio of the seventh peak to the second peak is 20 or less.

3. The method according to claim 2, wherein
the niobium oxide includes the mixture of the plurality of crystal forms such that at least either:
an intensity ratio of the fifth peak to the second peak is 2 or less; or
an intensity ratio of the seventh peak to the second peak is 11 or less.

4. The method according to claim 3, wherein
the niobium oxide includes the mixture of the plurality of crystal forms such that at least either:
an intensity ratio of the fifth peak to the second peak is 1 or less or
an intensity ratio of the seventh peak to the second peak is 6 or less.

5. The method according to claim 1, further comprising:
sintering a mixture produced in the mixing step at a temperature of 1000° C. to 1300° C.; wherein
an atomic ratio of niobium to titanium is 1 to 3.

* * * * *